(12) United States Patent
Ikefuji et al.

(10) Patent No.: US 11,841,422 B2
(45) Date of Patent: Dec. 12, 2023

(54) SYNTHETIC APERTURE RADAR SIGNAL PROCESSING DEVICE AND SIGNAL PROCESSING METHOD

(71) Applicant: NEC Corporation, Tokyo (JP)

(72) Inventors: Daisuke Ikefuji, Tokyo (JP); Taichi Tanaka, Tokyo (JP); Osamu Hoshuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 89 days.

(21) Appl. No.: 17/613,210

(22) PCT Filed: May 29, 2019

(86) PCT No.: PCT/JP2019/021199
§ 371 (c)(1),
(2) Date: Nov. 22, 2021

(87) PCT Pub. No.: WO2020/240720
PCT Pub. Date: Dec. 3, 2020

(65) Prior Publication Data
US 2022/0221577 A1    Jul. 14, 2022

(51) Int. Cl.
*G01S 13/90* (2006.01)
(52) U.S. Cl.
CPC ........ *G01S 13/9023* (2013.01); *G01S 13/904* (2019.05); *G01S 13/9011* (2013.01)
(58) Field of Classification Search
CPC . G01S 13/9023; G01S 13/904; G01S 13/9011
USPC .......................................................... 342/22
See application file for complete search history.

(56) References Cited

U.S. PATENT DOCUMENTS

| | | | | |
|---|---|---|---|---|
| 3,768,096 A | * | 10/1973 | Dentino | G01S 13/9011 342/99 |
| 4,975,704 A | * | 12/1990 | Gabriel | G01S 13/87 342/25 C |
| 5,835,055 A | * | 11/1998 | van der Kooij | G01S 13/9023 342/25 C |
| 5,923,278 A | * | 7/1999 | Poehler | G01S 13/9019 342/25 C |

(Continued)

FOREIGN PATENT DOCUMENTS

| | | | | |
|---|---|---|---|---|
| JP | 2001-083243 A | | 3/2001 | |
| JP | 2001083243 A | * | 3/2001 | ............. G01S 13/90 |

OTHER PUBLICATIONS ("Singular Unit Restoration in Interferograms Based on Complex-Valued Markov Random Field Model for Phase Unwrapping", Yamaki et al., Jan. 2009 (Year: 2009).*

(Continued)

*Primary Examiner* — Nuzhat Pervin
(74) *Attorney, Agent, or Firm* — Sughrue Mion, PLLC

(57) ABSTRACT

The signal processing device includes an interference processing unit which generates an interferogram from a plurality of SAR images, a coherence calculation unit which calculates coherence of the SAR images, a singular point processing unit which performs an operation for resolving singular points in the interferogram, a phase unwrapping unit which executes a phase unwrapping process using operation result of the singular point processing unit, and an SBAS analysis unit which performs displacement analysis by SBAS, using processing result of the phase unwrapping unit.

12 Claims, 14 Drawing Sheets

(56) References Cited

U.S. PATENT DOCUMENTS

| | | | | |
|---|---|---|---|---|
| 8,482,453 | B2* | 7/2013 | Costantini | G01S 13/9023 342/25 R |
| 10,495,750 | B1* | 12/2019 | Musgrove | G01S 13/904 |
| 10,852,421 | B1* | 12/2020 | Chartrand | G01S 13/9023 |
| 11,269,072 | B2* | 3/2022 | Sowter | G01S 13/9027 |
| 2012/0019410 | A1* | 1/2012 | Ferretti | G01S 13/9023 342/25 C |
| 2017/0146651 | A1* | 5/2017 | Liu | G01S 13/89 |
| 2020/0394780 | A1* | 12/2020 | Sowter | G01S 13/9027 |
| 2022/0221577 | A1* | 7/2022 | Ikefuji | G01S 13/9011 |

OTHER PUBLICATIONS (SingularUnitRestorationinInterferogramsBasedonComplex-ValuedMarkovRandomFieldModelforPhaseUnwrapping, Yamakietal. ,Jan. 2009(Year:2009) (Year: 2009).*

A Modificastion to the Complex-Valued MRF Modeling Filter of Interferometric SAR Phase (Li et al. , IEEE Geoscience and Remote Sensitng letters, vol. 12, No. 3, Mar. 2015 (Year: 2015).*

A New Algorithm for Surface Deformation Monitoring Based on small Baseline Differential SAR Interferograms (Berardino et al., IEEE Transactions on Geoscience and Remote Sensing, vol. 40, No. 11, Nov. 2002) (Year: 2002).*

Adaptive Noise Reduction of InSAR Images Based on a Complex-Valued MRF Model and ITs Apploication to Phase Unwrapping Problem (Suksmoni et al. , IEE Transactions on Geoscience and Remote Sensing, vol. 40, No. 3, Mar. 2002) (Year: 2002).*

International Search Report for PCT Application No. PCT/JP2019/021199, dated Jul. 2, 2019.

Berardino, Paolo et al., "A New Algorithm for Surface Deformation Monitoring Based on Small Baseline Differential SAR Interferograms", IEEE Transactions on Geoscience and Remote Sensing, Nov. 2002, vol. 40, No. 11, pp. 2375-2383, DOI:10.1109/TGRS.2002.803792.

Yamaki, Ryo et al., "Singular Unit Restoration in Interferograms Based on Complex-Valued Markov Random Field Model for Phase Unwrapping", IEEE Geoscience and Remote Sensing Letters, Jan. 2009, vol. 6, No. 1, pp. 18-22, DOI:10.1109/LGRS.2008.2005588.

Li, Hongyu et al., "A Modification to the Complex-Valued MRF Modeling Filter of Interferometric SAR Phase", IEEE Geoscience and Remote Sensing Letters, Mar. 2015, vol. 12, No. 3, pp. 681-685, DOI:10.1109/LGRS. 2014.2357449.

Suksmono, Andriyan Bayu et al., "Adaptive Noise Reduction of InSAR Images Based on a Complex-Valued MRF Model and Its Application to Phase Unwrapping Problem", IEEE Transactions on Geoscience and Remote Sensing, Mar. 2002, vol. 40, No. 3, pp. 699-709, DOI:10.1109/TGRS. 2002.1000329.

\* cited by examiner (ANALYSIS RESULT)

SYNTHETIC APERTURE RADAR SIGNAL PROCESSING DEVICE AND SIGNAL PROCESSING METHOD

This application is a National Stage Entry of PCT/JP2019/021199 filed on May 29, 2019, the contents of all of which are incorporated herein by reference, in their entirety.

TECHNICAL FIELD

The present invention relates to a signal processing device and a signal processing method that perform signal processing for observation data in a synthetic aperture radar.

BACKGROUND ART

Synthetic aperture radar (SAR) technology is a technology for artificially synthesizing to produce an aperture so as to obtain an image equivalent to the image by an antenna having a large aperture, when a flying object (artificial satellite, aircraft, etc.) transmits and receives a radio wave while it moves. SAR technology is a remote sensing technology in which electromagnetic waves are irradiated from the sky to the ground, and the reflected intensity and phase from the ground are imaged as SAR images.

By measuring a phase change between multiple SAR images, it is possible to measure small variations of reflection points constituting the SAR image. SAR is used, for example, in the field of monitoring ground subsidence due to tunnel construction and landslides in mountainous areas.

Interferometric SAR analysis is an effective method for detecting ground surface deformation. In the interferometric SAR analysis, the phase difference between radio signals of two SAR images taken at different times is calculated. Then, a change in distance (range) between the flying object and the ground that occurred during the imaging time period is detected.

One of the interferometric SAR analysis methods is SBAS (Small BAseline Subset) (refer to, for example, non-patent literature 1). SBAS generates a large number of interferograms with a small vertical baseline length (small baseline) and a short imaging date interval, and estimates an amount of variability at each observation. SBAS can extract time-series variations while suppressing influence of spatial and temporal interference degradation. SBAS is an effective method, for example, for noisy vegetated areas. SBAS can also analyze a non-linear displacement in time.

Non patent literature 2 describes singular point removal method based on the Complex-Valued Markov Random Field (CMRF) model.

CITATION LIST

Non Patent Literature

NPL 1: P. Berardino et al., "A New Algorithm for Surface Deformation Monitoring Based on Small Baseline Differential SAR Interferograms," IEEE Transactions on Geoscience and Remote Sensing, Vol. 40, No. 11, November 2002

NPL 2: R. Yamaki et al., "Singular Unit Restoration in Interferograms Based on Complex-Valued Markov Random Field Model for Phase Unwrapping," IEEE Geoscience and Remote Sensing Letters, Vol. 6, No 1, January 2009

SUMMARY OF INVENTION

Technical Problem

In an interferogram, the value range of a phase is limited to $-\pi$ to $\pi$ (wrapped). Therefore, the phase unwrapping process is performed to restore the phase back to absolute phase. In order to make the phase unwrapping process more accurate and to increase the accuracy of the displacement analysis, filtering is generally performed using a Goldstein filter or the like for noise removal (denoising).

However, even if the denoising process is executed, the phase unwrapping process may not be executed accurately depending on how singular points appear, such as singular points are concentrated in a narrow area. If the phase unwrapping process is not performed correctly, the accuracy of the displacement analysis by the SBAS method will be degraded.

It is an object of the present invention to provide a signal processing device and a signal processing method for synthetic aperture radar that can suppress degradation of accuracy of displacement analysis caused by phase unwrapping process when displacement analysis is performed using the SBAS method.

Solution to Problem

A signal processing device for synthetic aperture radar according to the present invention includes interference processing means for generating an interferogram from a plurality of SAR images, coherence calculation means for calculating coherence of the SAR images, singular point processing means for performing an operation for resolving singular points in the interferogram, phase unwrapping means for executing a phase unwrapping process using operation result of the singular point processing means, and SBAS analysis means for performing displacement analysis by SBAS, using processing result of the phase unwrapping means.

The signal processing method for synthetic aperture radar according to the present invention includes generating an interferogram from a plurality of SAR images, calculating coherence of the SAR images, performing an operation for resolving singular points in the interferogram, executing a phase unwrapping process using operation result of the singular point processing means, and performing displacement analysis by SBAS, using result of the phase unwrapping process.

A signal processing program for a synthetic aperture radar according to the present invention causes a computer to execute a process of generating an interferogram from a plurality of SAR images, a process of calculating coherence of the SAR images, a process of performing an operation for resolving singular points in the interferogram, a process of executing a phase unwrapping process using operation result of the singular point processing means, and a process of performing displacement analysis by SBAS, using result of the phase unwrapping process.

Advantageous Effects of Invention

According to the present invention, when performing displacement analysis using the SBAS method, degradation of accuracy of displacement analysis due to the phase unwrapping process is suppressed.

EXAMPLE EMBODIMENTS

Hereinafter, the example embodiment of the present invention is described with reference to the drawings.

Example Embodiment 1

Figure 1:
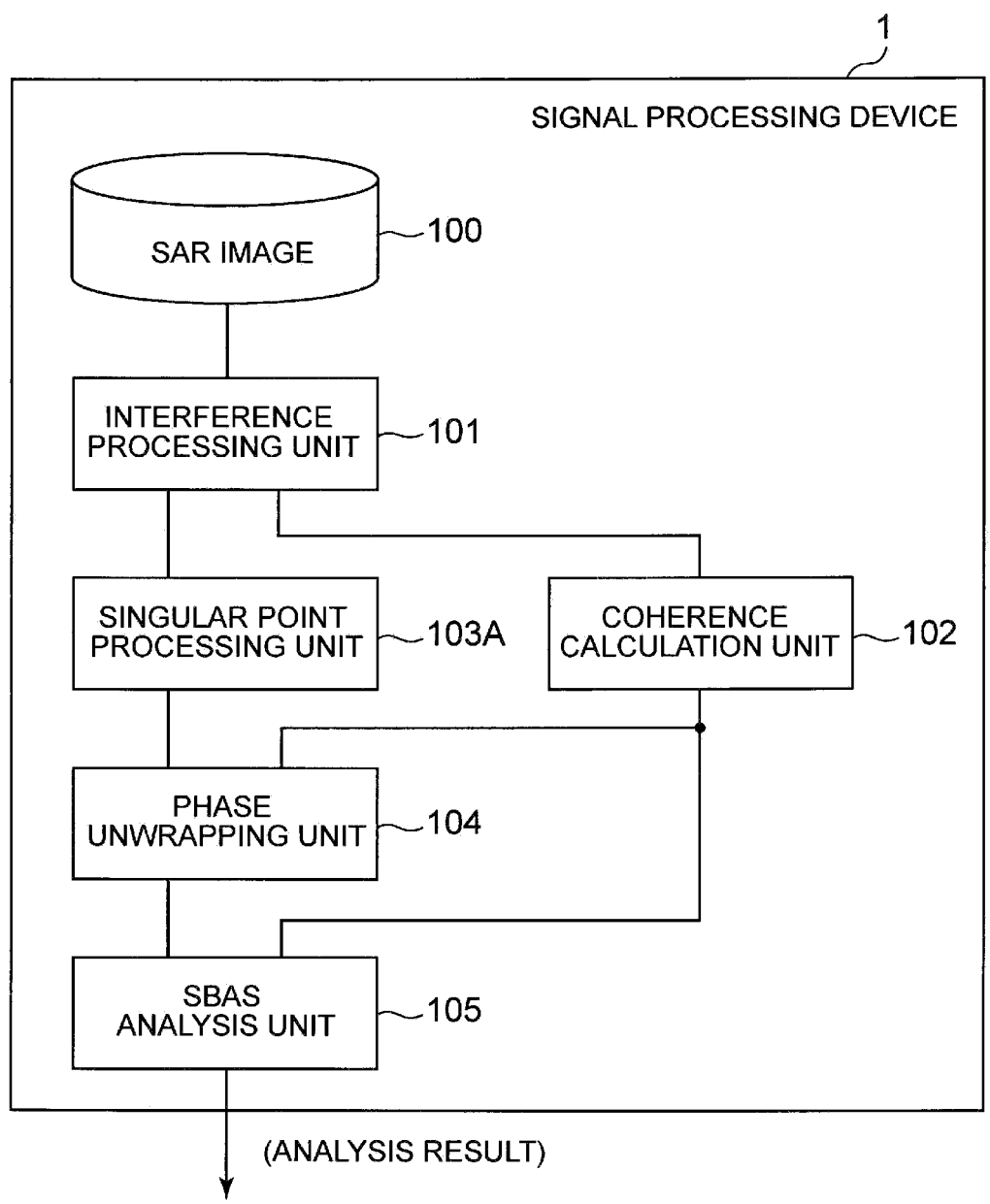
FIG. 1 It depicts a block diagram showing a configuration example of a signal processing device for a synthetic aperture radar of the first example embodiment.

FIG. 1 is a block diagram showing a configuration example of a signal processing device for a synthetic aperture radar of the first example embodiment.

The signal processing device 1 shown in FIG. 1 comprises a SAR image storage unit 100, an interference processing unit 101, a coherence calculation unit 102, a singular point processing unit 103A, a phase unwrapping unit 104, and an SBAS analysis unit 105.

The interference processing unit 101 interferes with each pixel between multiple (for example, two) SAR images stored in the SAR image storage unit 100 to obtain an interferogram.

The coherence calculation unit 102 calculates the coherence, which indicates the correlation between multiple (for example, two) SAR images.

The singular point processing unit 103A corrects singular points in the interferogram to generate an interferogram (corrected interferogram) in which there do not exit pixels which are considered to be singular points. The phase unwrapping unit 104 executes the phase unwrapping process on the corrected interferogram generated by the singular point processing unit 103A. The phase unwrapping unit 104 outputs the phase-unwrapped interferogram.

The SBAS analysis unit 105 performs displacement analysis based on SBAS.

Figure 2:
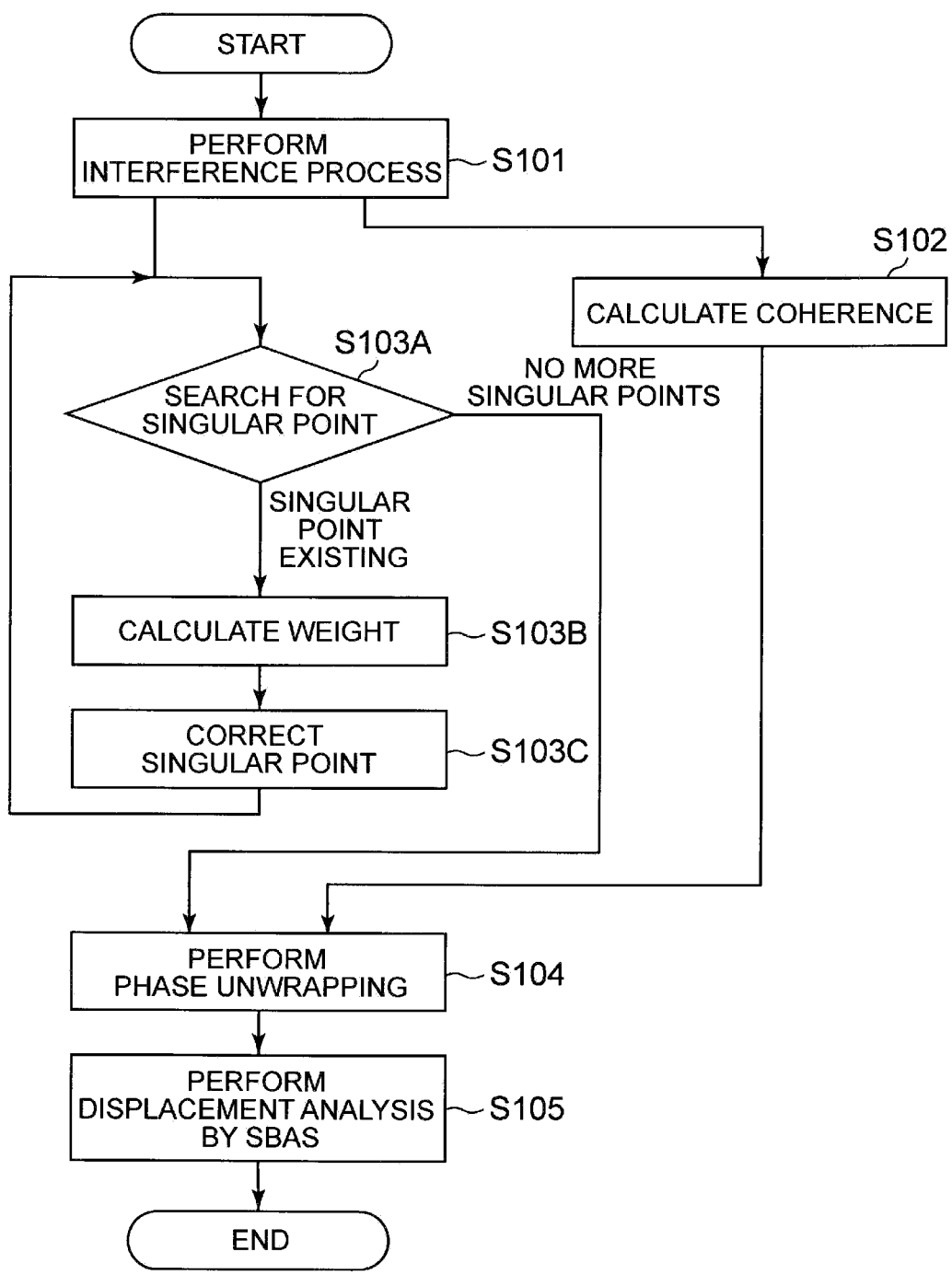
FIG. 2 It depicts a flowchart showing an operation of a signal processing device of the first example embodiment.

Next, the operation of the signal processing device 1 is described with reference to the flowchart of FIG. 2.

The interference processing unit 101 reads two SAR images, for example, from the SAR image storage unit 100 and generates an interferogram by interfering each pixel between the SAR images (step S101). The coherence calculation unit 102 calculates the coherence which indicates the correlation between SAR images (step S102). The coherence calculation unit 102 outputs a coherence image in which the coherence of each pixel is expressed, for example.

The singular point processing unit 103A generates a corrected interferogram which is an interferogram without any pixels considered to be singular points. The singular point processing unit 103A performs singular point removal based on the CMRF model, for example, described in non-patent literature 2.

The singular point removal method based on the CMRF model estimates the value of the pixel of a singular point (correction value) based on the surrounding pixels of the singular point. Specifically, in the interferogram, a matrix $\Lambda_{mn}$ representing correlation (CMRF parameter) between the pixels in the area of interest around the singular point and pixels in a window (including multiple pixels) adjacent to the area of interest is calculated. Then, using equation (1), the correlation $\Lambda'_{mn}$ of the area of interest is estimated.

[Math. 1]

$$\Lambda'_{mn} = \sum_{p \in P} w(p) \Lambda_{mn}(p) \tag{1}$$

In equation (1), P is an area of the same size as the window, centered on the area of interest. p is the position in the area P. w(p) is the weight. The weight is expressed by the equation (2). In equation (2), $r_p$ is a distance from the center of the area of interest to p. $N_{st}$ is the number of singular points in the window.

[Math. 2]

$$w(p) = \frac{1}{r_p^2} \exp(-N_{st}(p)) \left[ \sum_{p \in P} \frac{1}{r_p^2} \exp(-N_{st}(p)) \right]^{-1} \tag{2}$$

The value of the singular point after correction is expressed by equation (3). In equation (3), $q_s$ is a row vector whose elements are the values of the pixels in a given area, centered on the area of interest. Although $q_s$ may include the pixel of the singular point to be corrected, it is preferable that the pixel of the singular point to be corrected are not included.

[Math. 3]

$$z_{s_{mn}} = \Lambda'_{mn} q_s \tag{3}$$

The singular point processing unit 103A executes the process of steps S103A to S103C for each pixel in the interferogram.

In other words, the singular point processing unit 103A searches the pixels of the interferogram in a predetermined order to detect a singular point (step S103A). Once the singular point processing unit 103A finds a singular point, the singular point processing unit 103A calculates the weight using the above equation (2) (step S103B). Then, the singular point processing unit 103A performs calculation of the above equation (3), and replaces the pixel values around the singular point processing unit 103 with the calculation result (step S103C).

The singular point processing unit 103A repeatedly executes the process of steps S103B and S103C until there are no more singular points in the interferogram. When there are no more singular points in the interferogram, the singular point processing unit 103A terminates the process. In other words, the process moves to step S104. Alternatively, the singular point processing unit 103A terminates the process and moves to step S104 when the predetermined number of operations of the process has been executed.

In this example embodiment, the process of removing the singular points is performed based on the CMRF model, but the singular point processing unit 103A may perform the process of removing singular points using other methods. As an example, the singular point processing unit 103A may replace the pixel value for a singular point with an average value of the values of the pixels around the singular point.

In step S104, the phase unwrapping unit 104 performs the phase unwrapping process using the output of the singular point processing unit 103A, i.e., the interferogram with no pixels considered as singular points, while referring to the coherence. For example, the phase unwrapping unit 104 performs the phase unwrapping process by avoiding an area of low coherence in the interferogram. Then, the phase unwrapping unit 104 outputs the phase-unwrapped interferogram.

The SBAS analysis unit 105 performs displacement analysis to estimate amount of displacement using the SBAS method (step S105). That is, the SBAS analysis unit 105 uses a plurality of interferograms with short baseline lengths and short imaging date intervals, as described in the non-patent literature 1. Specifically, the SBAS analysis unit 105 generates interference pairs with short vertical baseline lengths and short time intervals from multiple interferograms. Then, the SBAS analysis unit 105 extracts pixels with high interferometric properties and detects the time-series displacement of the ground surface based on the extracted pixels. The SBAS analysis unit 105 selects short baselines with high coherence so that they are not affected by phase unwrapping errors.

In this example embodiment, since the phase unwrapping unit 104 performs phase unwrapping processing on the interferogram in which singular points have been removed by the singular point processing unit 103A, the SBAS analysis unit 105 can perform displacement analysis processing using the SBAS method with high accuracy.

Example Embodiment 2

Figure 3:
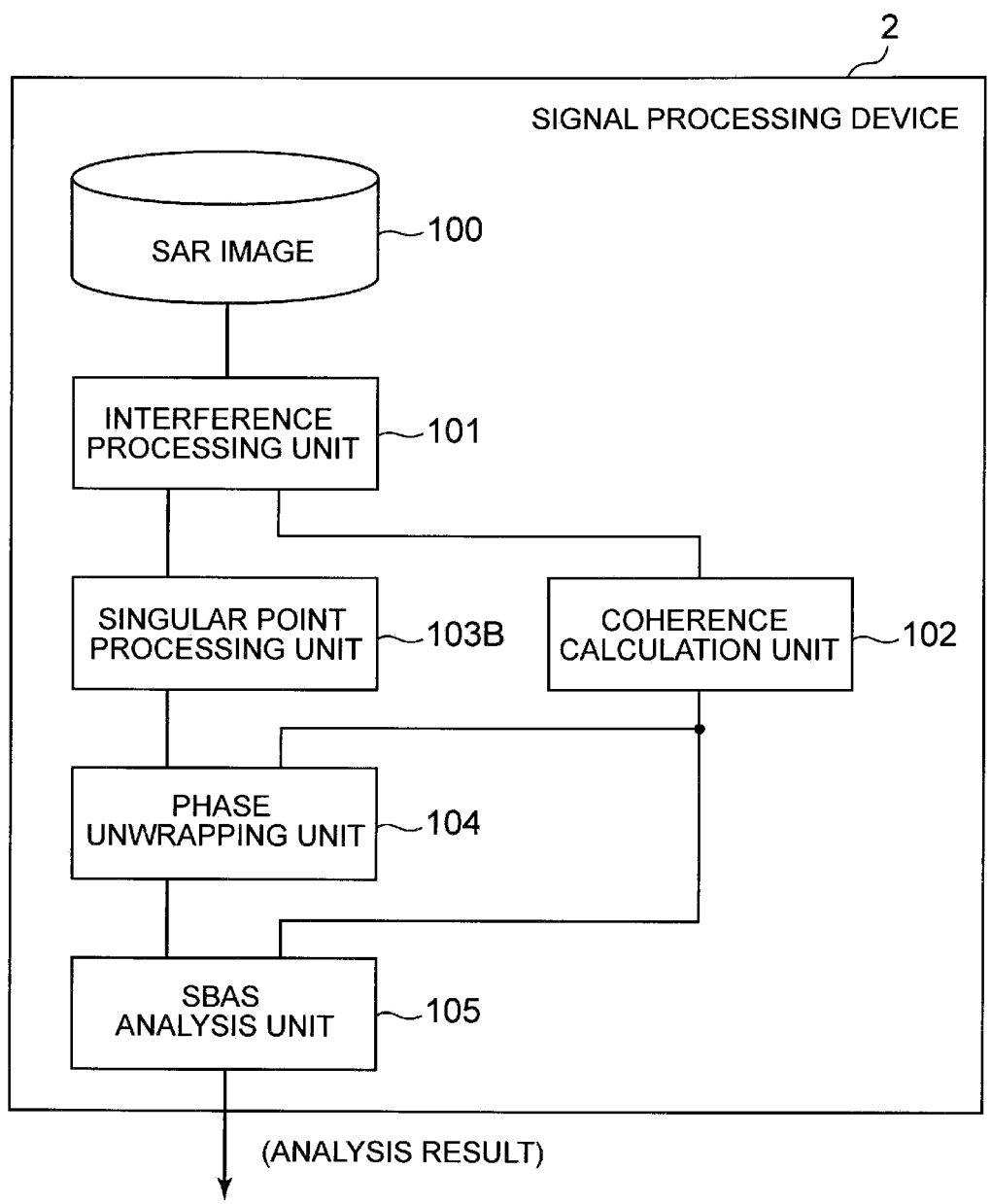
FIG. 3 It depicts a block diagram showing a configuration example of a signal processing device for a synthetic aperture radar of the second example embodiment.

FIG. 3 is a block diagram showing a configuration example of a signal processing device for a synthetic aperture radar of the second example embodiment. The configuration of the signal processing device 2 shown in FIG. 3 is basically the same as the configuration of the signal processing device 1 of the first example embodiment shown in FIG. 1. However, the function of the singular point processing unit 103B is different from the function of the singular point processing unit 103A shown in FIG. 1.

Figure 4:
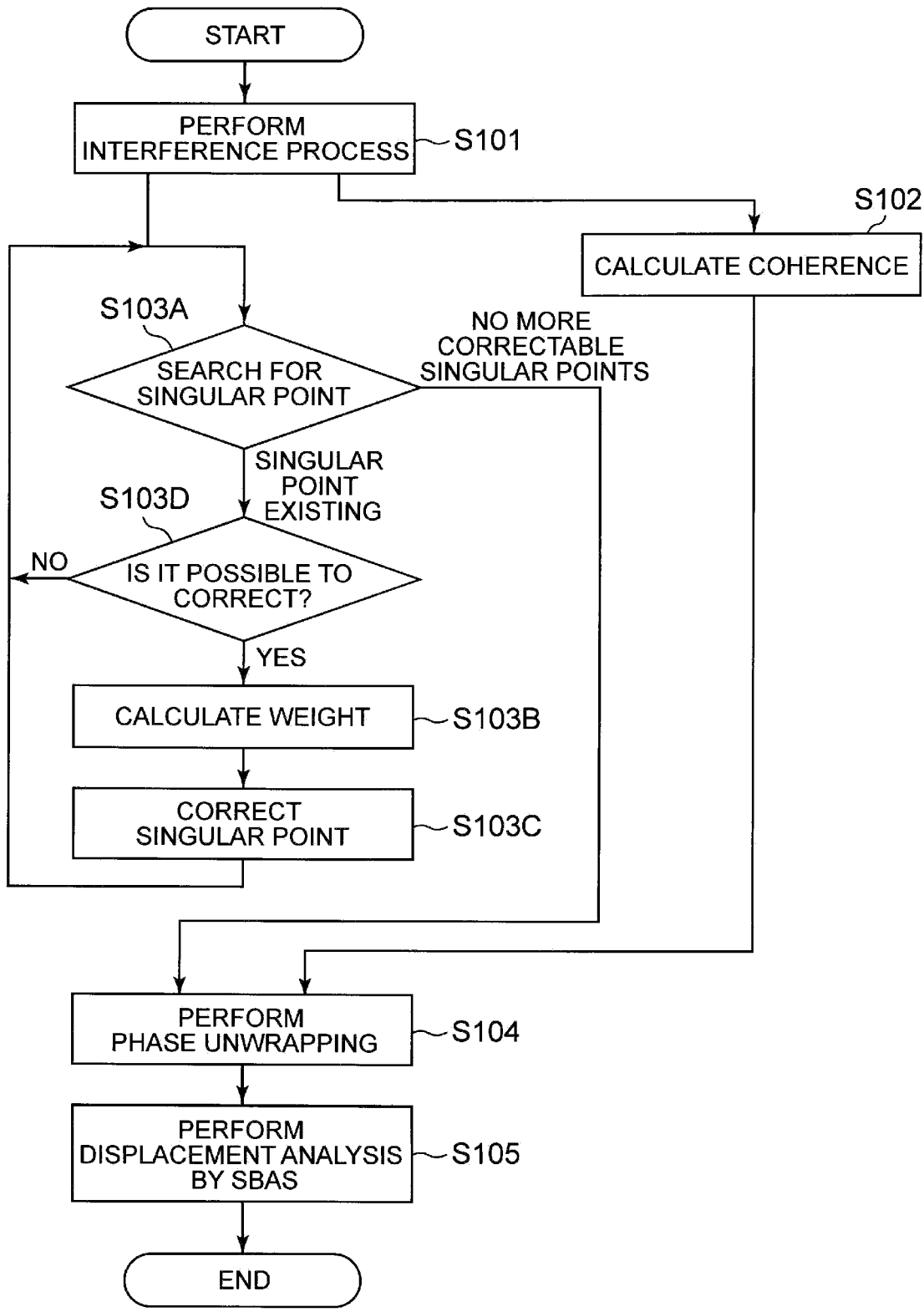
FIG. 4 It depicts a flowchart showing an operation of a signal processing device of the second example embodiment.

Next, the operation of the signal processing device 2 is described with reference to the flowchart in FIG. 4. The processing of steps S101, S102, S104, and S105 is the same as the processing of the signal processing device 1 of the first example embodiment.

In this example embodiment, the singular point processing unit 103B determines whether a singular point should be corrected or not if the singular point is found in the process of step S103A (step S103D). If the singular point processing unit 103B determines that the singular point should be corrected, the singular point processing unit 103B executes the process of steps S103B and S103C. In this example embodiment, the singular point processing unit 103B terminates the process when there are no more singular points that can be corrected, or when a predetermined number of processes have been executed.

In the process of step S103D, the singular point processing unit 103B determines whether the pixels around the singular point are pixels that can be used for correction, for example.

As an example, the singular point processing unit 103B determines that the singular point should not be corrected when the noise exceeds a predetermined threshold in one or more peripheral pixels of the singular point. The singular point processing unit 103B may determine that the singular point to be processed should not be corrected when the number of singular points in a plurality of surrounding pixels for the singular point to be processed exceeds a predetermined threshold.

In the process of executing the loop process of steps S103A to S103C, since the number of singular points in the interferogram decreases, the number of peripheral pixels available for correction increases. As a result, the number of singular points that can be corrected should gradually increase. In other words, as the number of times the loop process of steps S103A to S103C is executed increases, the number of singular points that cannot be corrected decreases.

In this example embodiment, it is prevented that a singular point is corrected based on peripheral pixels that are not appropriate to be used for correction. In other words, deterioration of the singular point based on the correction is prevented.

Example Embodiment 3

Figure 5:
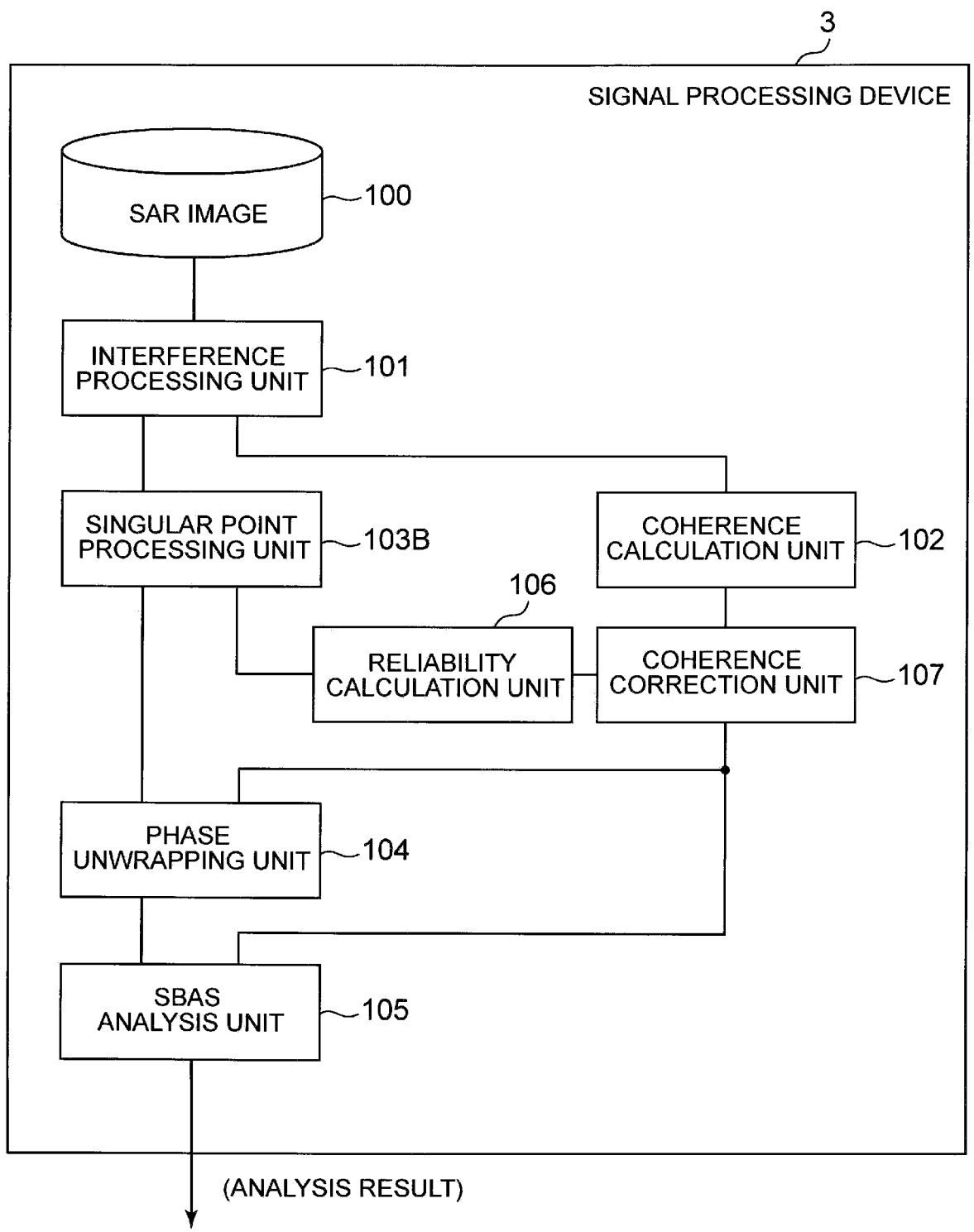
FIG. 5 It depicts a block diagram showing a configuration example of a signal processing device for a synthetic aperture radar of the third example embodiment.

FIG. 5 is a block diagram showing a configuration example of a signal processing device for a synthetic aperture radar of the third example embodiment. The configuration of the signal processing device 3 shown in FIG. 5 is the signal processing device 3 of the second example embodiment shown in FIG. 3 with the addition of a reliability calculation unit 106 and a coherence correction unit 107.

Figure 6:
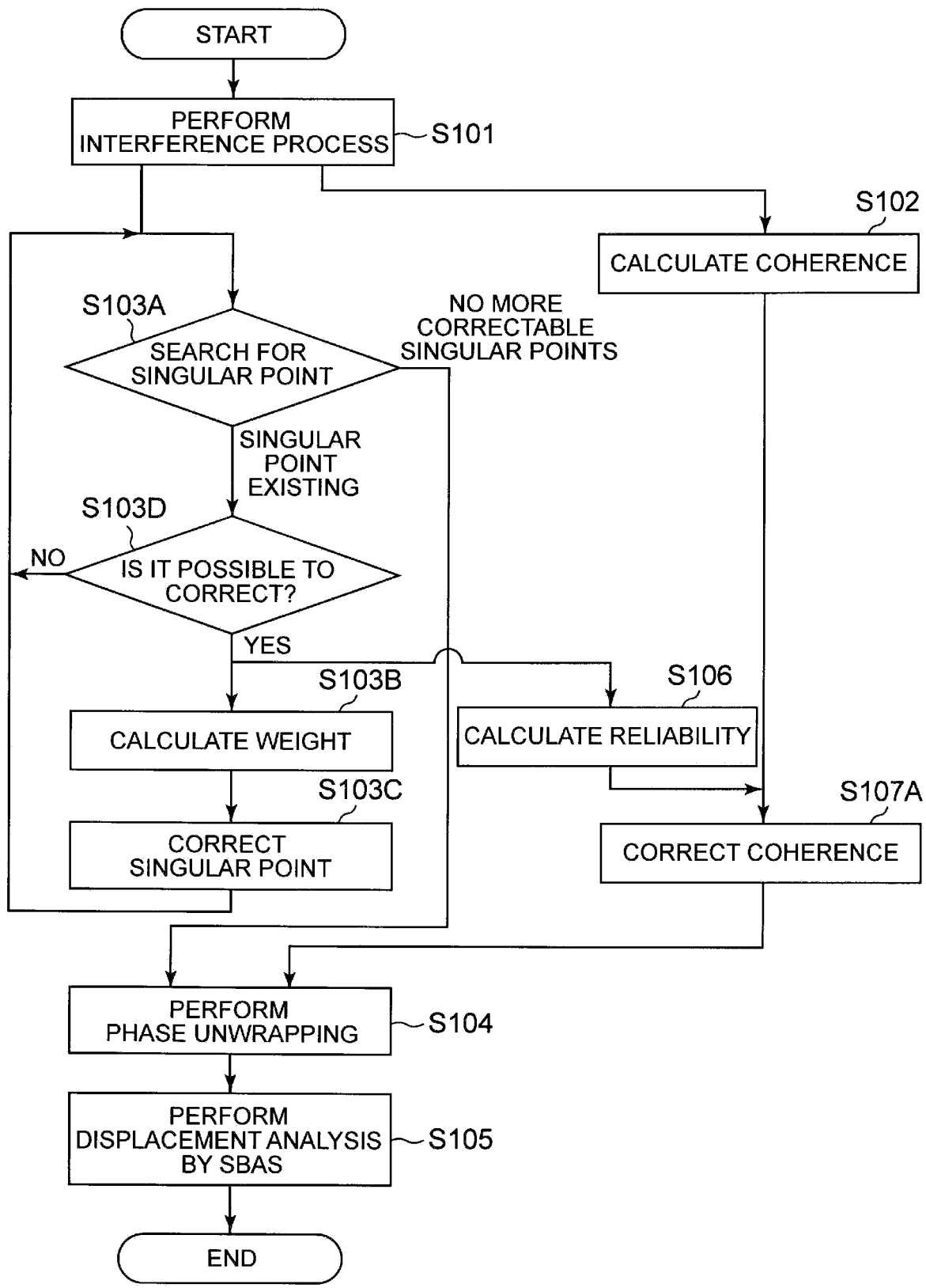
FIG. 6 It depicts a flowchart showing an operation of a signal processing device of the third example embodiment.

Next, the operation of the signal processing device 3 is described with reference to the flowchart in FIG. 6. The processing of steps S101, S102, S103A to S103D, S104, and S105 is the same as the processing of the signal processing device 2 of the second example embodiment.

In this example embodiment, the reliability calculation unit 106 calculates reliability of the corrected pixel value of the singular point based on the degree of determination in the process of determining whether the singular point can be corrected (step S104D). For example, the reliability calculation unit 106 increases the reliability corresponding to the singular point that is determined to be correctable at a relatively early stage between the start and the end of the loop process of steps S103A to S103C. On the contrary, the reliability calculation unit 106 decreases the reliability corresponding to the singular point determined to be correctable at a late stage. The situation where the singular point is determined to be correctable at an early stage means that the number of singular points among the plurality of pixels around the target singular point is small.

The coherence correction unit 107 corrects the coherence calculated by the coherence calculation unit 102 using the calculated reliability (step S107A). For example, the coherence correction unit 107 corrects the coherence by multiplying the coherence corresponding to the pixel after the correction of the singular point by the value of the reliability.

The signal processing device 2 of the second example embodiment performs phase unwrapping using an interferogram in which singular points have been corrected. However, unwrapping errors may occur if there are pixels with low coherence.

However, by using coherence with corrected singular points (coherence with improved reliability) in the phase unwrapping process, the possibility of unwrapping errors is reduced. In addition, by using coherence with improved reliability in the displacement analysis process which estimates the displacement using the SBAS method, the accuracy of the displacement analysis is improved.

Example Embodiment 4

Figure 7:
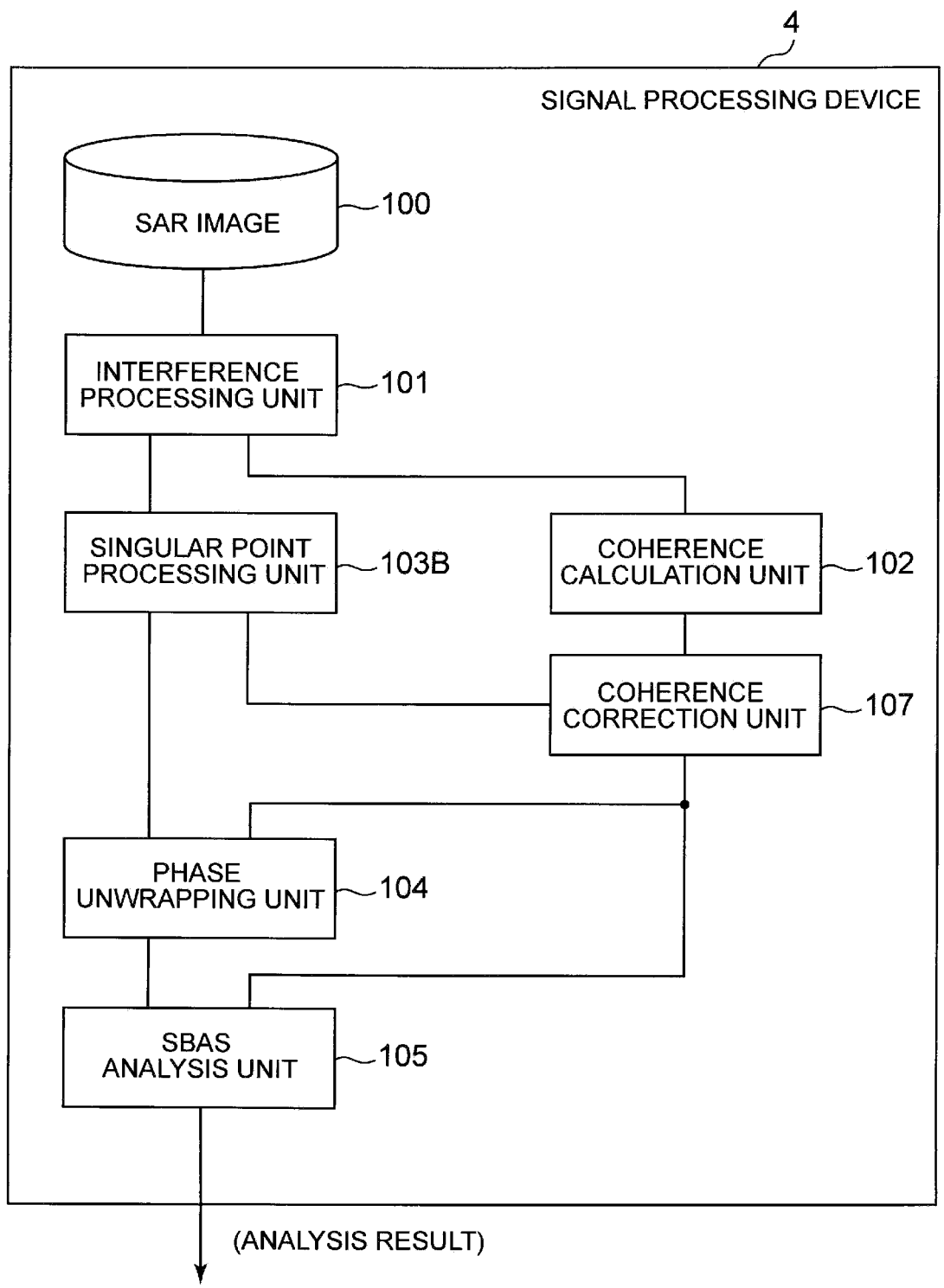
FIG. 7 It depicts a block diagram showing a configuration example of a signal processing device for a synthetic aperture radar of the fourth example embodiment.

FIG. 7 is a block diagram showing a configuration example of a signal processing device for a synthetic aperture radar of the fourth example embodiment. The configuration of the signal processing unit 4 shown in FIG. 7 is the signal processing unit 3 of the second example embodiment shown in FIG. 3, with the addition of a coherence correction unit 107.

Figure 8:
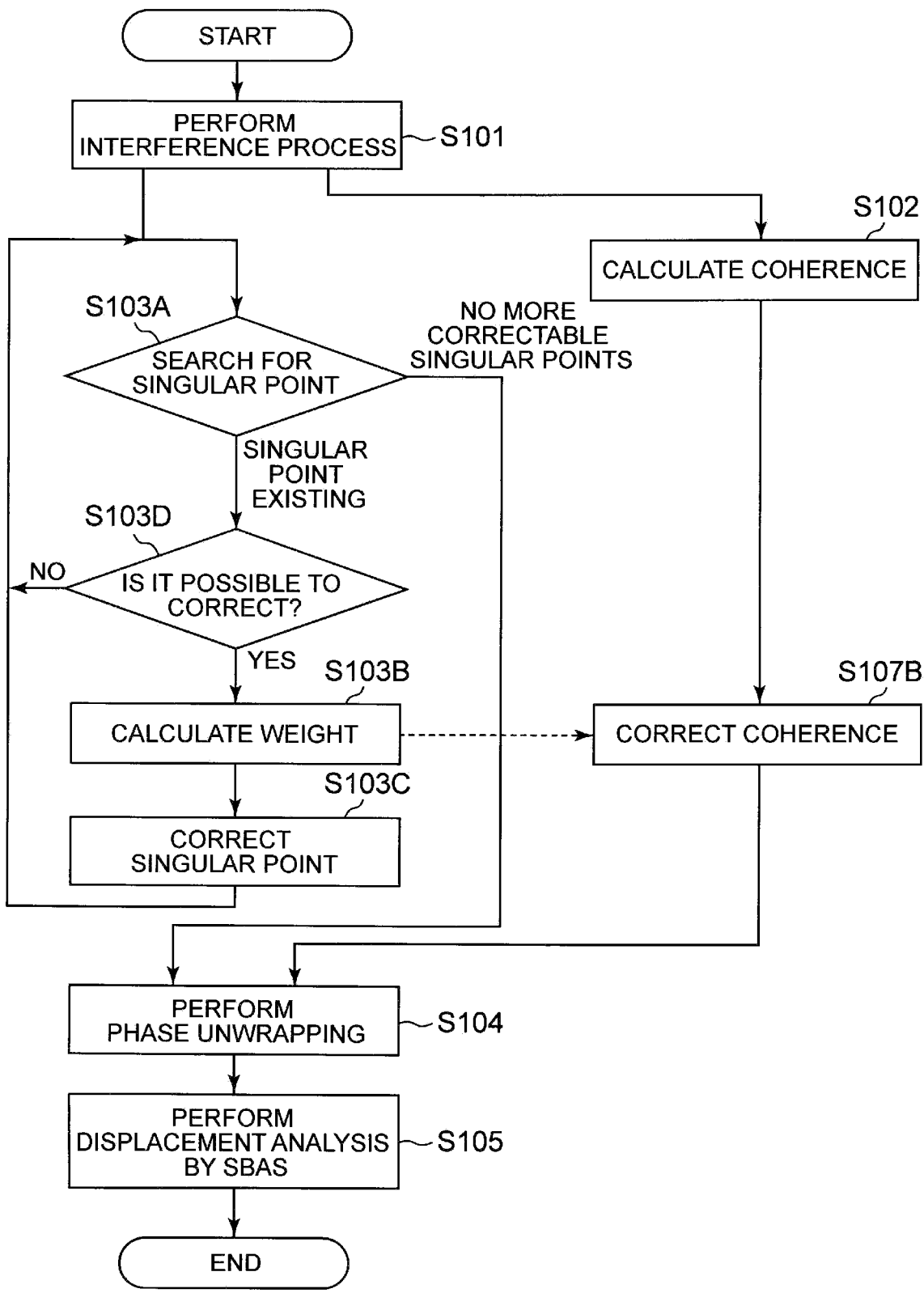
FIG. 8 It depicts a flowchart showing an operation of a signal processing device of the fourth example embodiment.

Next, the operation of the signal processing device 4 is described with reference to the flowchart in FIG. 8. The processing of steps S101, S102, S103A to S103D, S104, and S105 is the same as the processing of the signal processing device 2 of the second example embodiment.

In this example embodiment, the coherence correction unit 107 corrects the coherence calculated by the coherence calculation unit 102 with the weight calculated by the singular point processing unit 103B in the process of step S103B (step S107B). For example, the coherence correction unit 107 multiplies the coherence calculated by the coherence calculation unit 102 by the weight. The coherence correction unit 107 may assign an arbitrary coherence value to the pixel to be corrected at the point when the weight exceeds the arbitrary weight at which the correction is possible.

Referring to the equation (2), the value of the weight becomes smaller the more the number of singular points in the surrounding pixels. Therefore, when the coherence calculated by the coherence calculator 102 is corrected by the weight, the smaller the number of singular points in the surrounding pixels, the larger the degree of correction. In other words, the concept of the correction of coherence in this example embodiment is the same as the concept of the correction of coherence in the third example embodiment.

Therefore, the possibility of unwrapping errors is reduced by using coherence with corrected singular point (coherence with improved reliability) in the phase unwrapping process. In addition, by using coherence with improved reliability in the displacement analysis process which estimates the displacement using the SBAS method, the accuracy of the displacement analysis is improved.

The signal processing unit 4 of this example embodiment comprises the singular point processing unit 103B used in the second example embodiment, but it may comprise the singular point processing unit 103A used in the first example embodiment.

Example Embodiment 5

Figure 9:
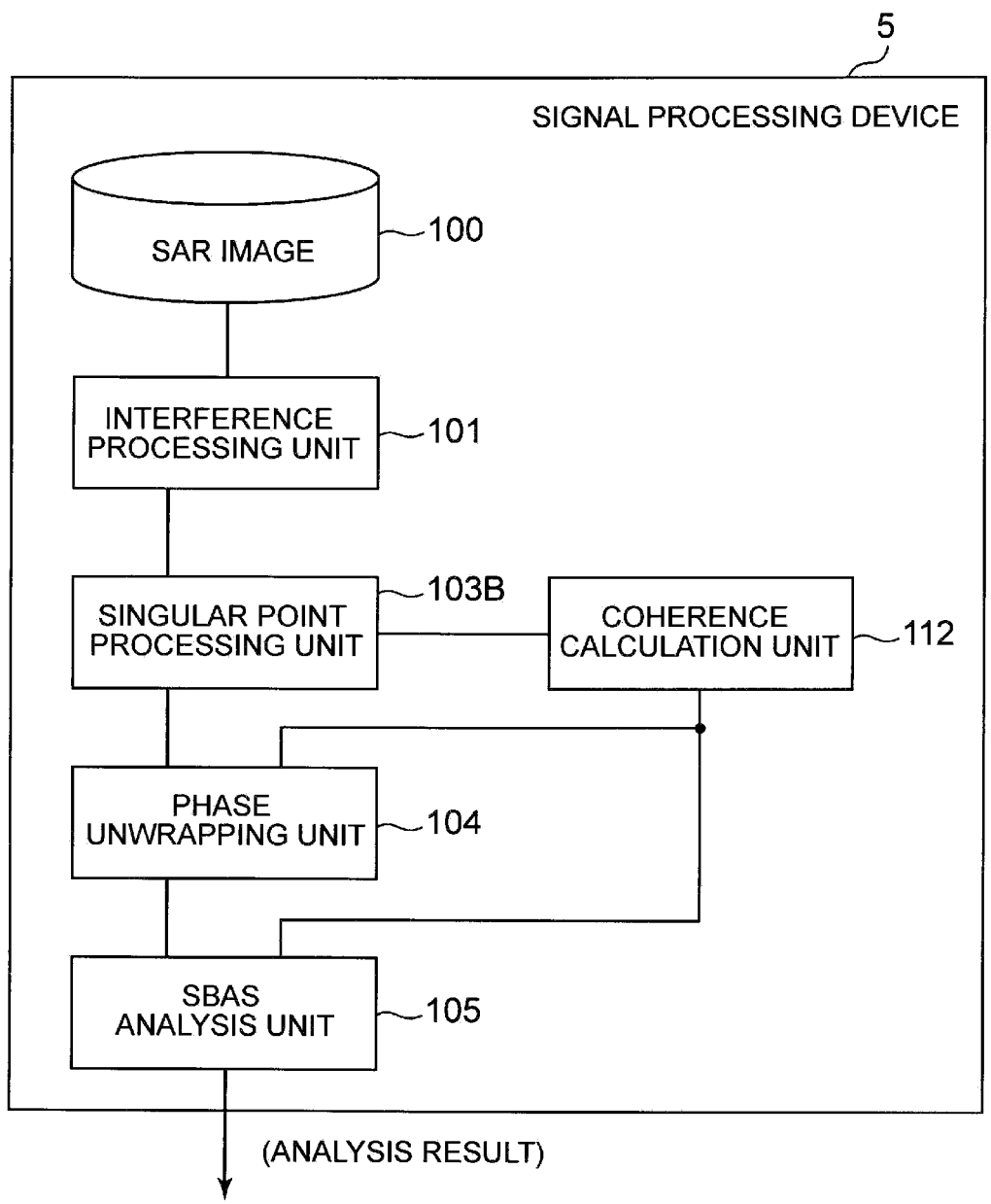
FIG. 9 It depicts a block diagram showing a configuration example of a signal processing device for a synthetic aperture radar of the fifth example embodiment.

FIG. 9 is a block diagram showing a configuration example of a signal processing device for a synthetic aperture radar of the fifth example embodiment. The configuration of the signal processing unit 5 shown in FIG. 9 is that a coherence calculation unit 112 is provided in place of the coherence calculation unit 102 in the signal processing unit 3 of the second example embodiment shown in FIG. 3. The coherence calculating unit 112 calculates coherence from the interferogram with no pixels considered to be singular points (specifically, an interferogram with no correctable singular points) output by the singular point processing unit 103A.

Figure 10:
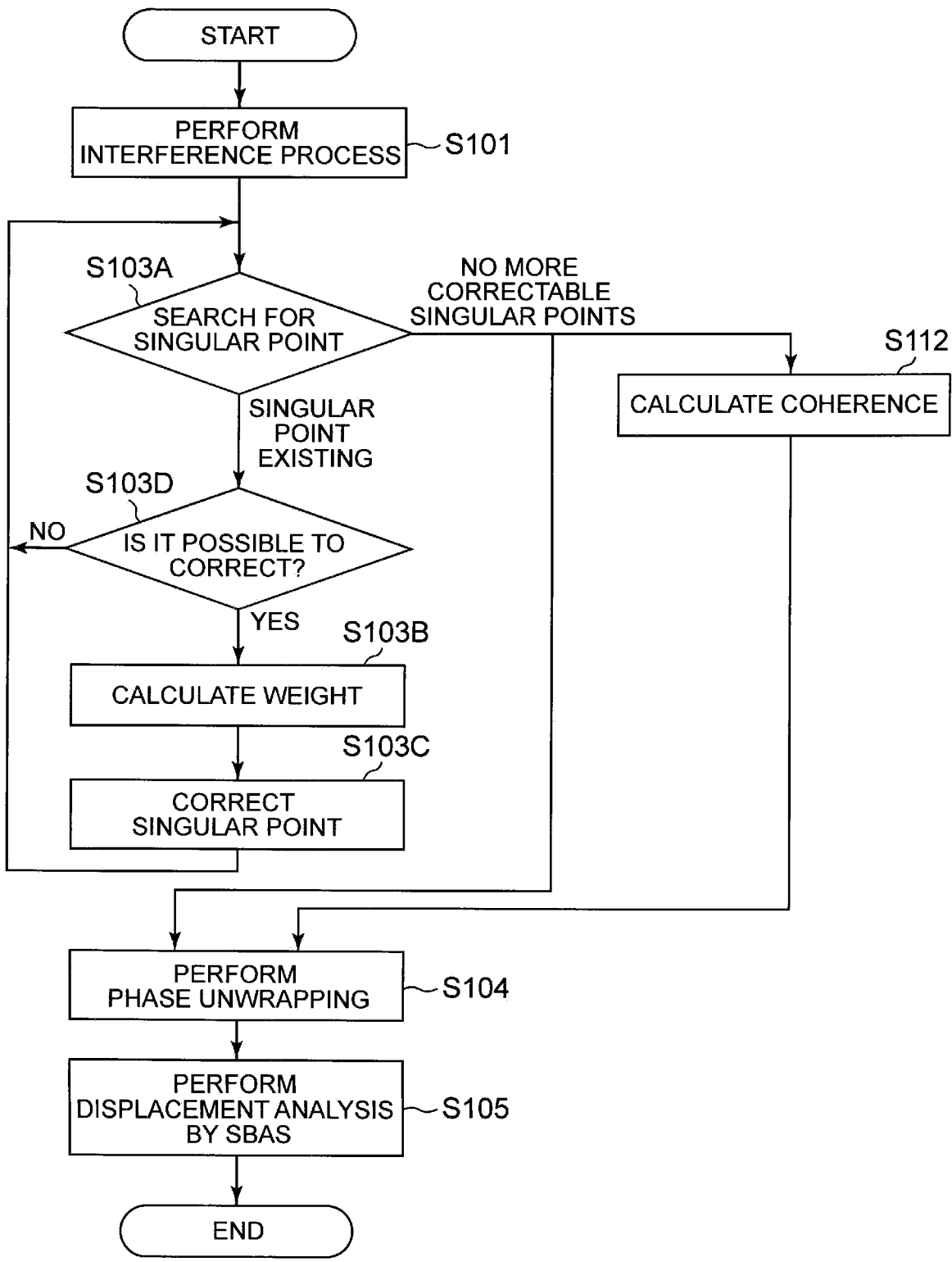
FIG. 10 It depicts a flowchart showing an operation of a signal processing device of the fifth example embodiment.

Next, the operation of the signal processing device 5 will be described with reference to the flowchart in FIG. 10. The processing of steps S101, S103A to S103D, S104, and S105 is the same as the processing of the signal processing device 2 of the second example embodiment.

In this example embodiment, when the singular point processing unit 103B determines that there are no more singular points that can be corrected (step S103A), the coherence calculation unit 112 calculates the coherence using the interferogram corrected by the singular point processing unit 103B (step S112).

The interferogram output by the singular point processing unit 103B is a highly reliable interferogram in which the singular points have been eliminated. Therefore, the possibility of unwrapping errors in the phase unwrapping process is reduced. In addition, by using coherence with improved reliability in the displacement analysis process which estimates the displacement using the SBAS method, the accuracy of the displacement analysis is improved.

The signal processing device 5 of this example embodiment comprises the singular point processing unit 103B used in the second example embodiment, but it may comprise the singular point processing unit 103A used in the first example embodiment.

(Modification)

In the third to fifth example embodiments, the phase unwrapping and displacement analysis processes are performed using the coherence (corrected coherence) generated based on the processing process (for example, calculated weight) or processing result (interferogram with singular points eliminated) of the singular point processing unit 103B.

However, the signal processing device may be configured to use the corrected coherence for either the phase unwrapping process or the displacement analysis process.

Figure 11:
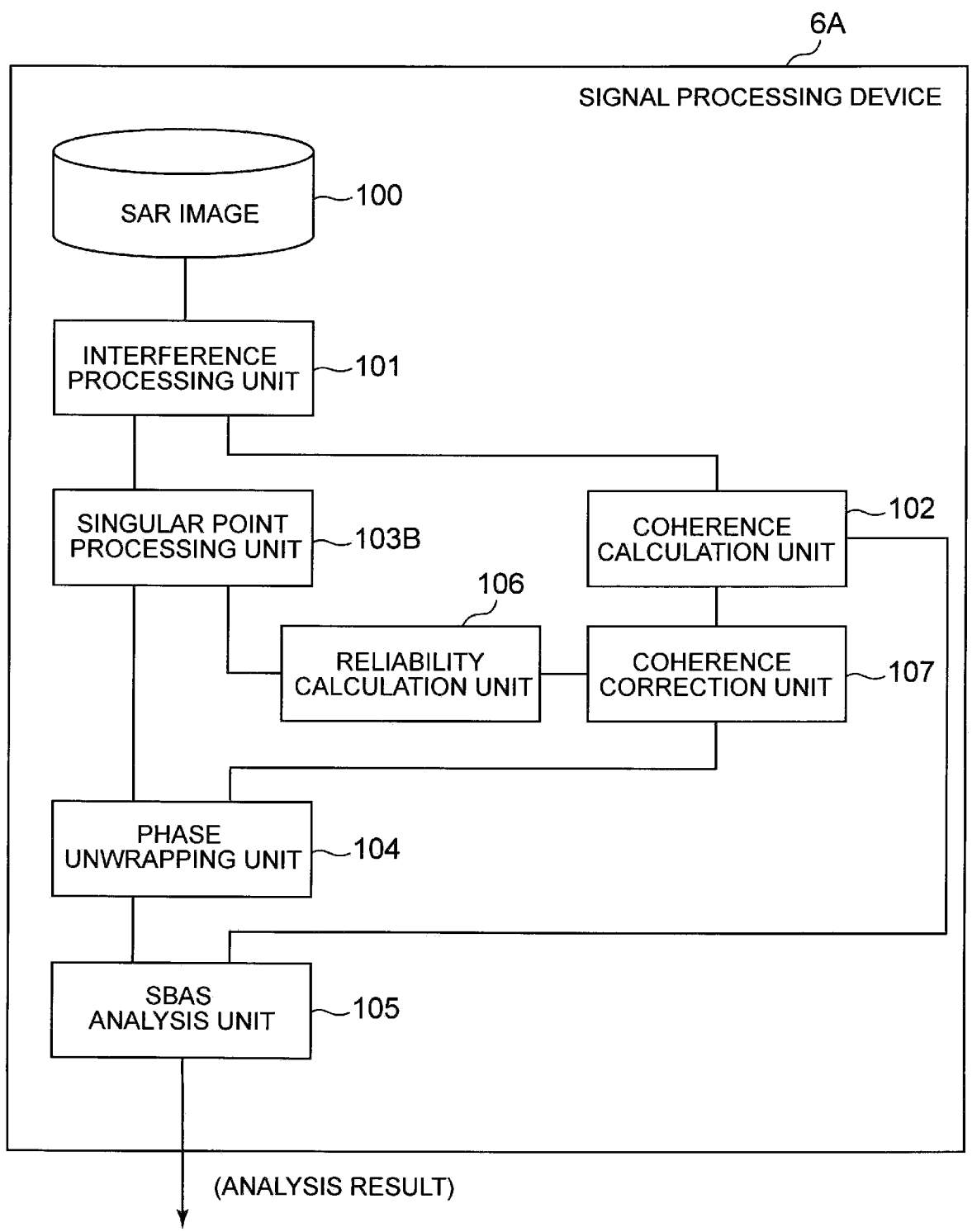
FIG. 11 It depicts a block diagram showing a configuration example of a signal processing device for a synthetic aperture radar of the first modification.

FIG. 11 is a block diagram showing a configuration example of a signal processing device 6A for a synthetic aperture radar of the first modification. In the signal processing unit 6A shown in FIG. 11, the phase unwrapping unit 104 uses the corrected coherence, while the SBAS analysis unit 105 uses the coherence calculated by the coherence calculation unit 102.

Figure 12:
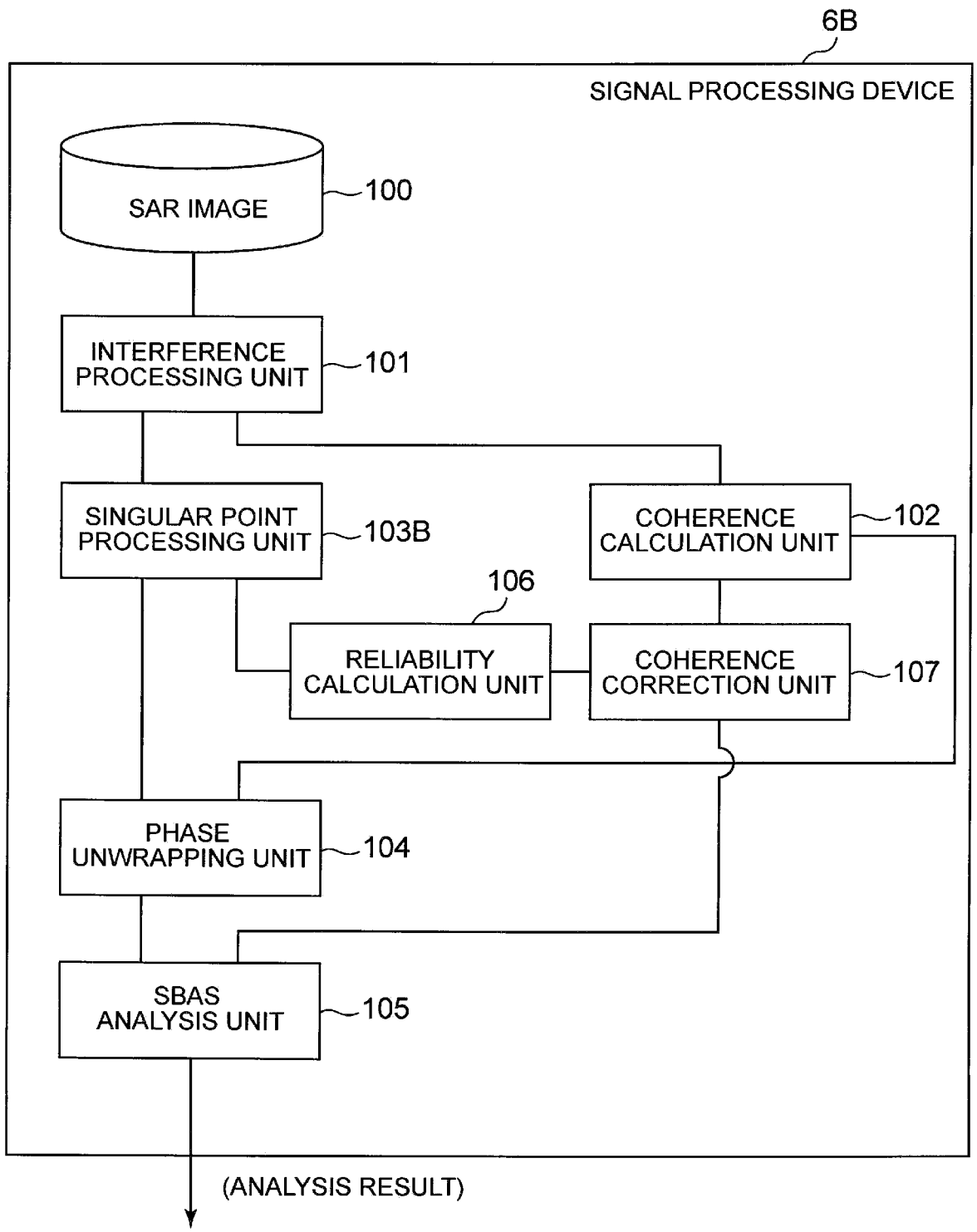
FIG. 12 It depicts a block diagram showing a configuration example of a signal processing device for a synthetic aperture radar of the second modification.

FIG. 12 is a block diagram showing a configuration example of a signal processing device 6B for a synthetic aperture radar of the second modification. In the signal processing unit 6B shown in FIG. 12, the SBAS analysis unit 105 uses the corrected coherence, while the phase unwrapping unit 104 uses the coherence calculated by the coherence calculation unit 102.

In the signal processing units 6A and 6B shown in FIGS. 11 and 12, since the phase unwrapping unit 104 performs phase unwrapping processing on the interferogram in which singular points have been removed by the singular point processing unit 103B, the SBAS analysis unit 105 can perform displacement analysis processing using the SBAS method with high accuracy.

The signal processing devices 6A and 6B shown in FIGS. 11 and 12 comprise the singular point processing unit 103B used in the second example embodiment, but may also be configured with the singular point processing unit 103A used in the first example embodiment.

The signal processing devices 6A and 6B shown in FIGS. 11 and 12 comprise the reliability calculation unit 106 used in the third example embodiment, but like the signal processing device 4 of the fourth example embodiment, the coherence correction unit 107 may be configured to correct the coherence using the weight calculated by the singular point processing unit 103B (or singular point processing unit 103A).

In the signal processing devices 6A and 6B shown in FIGS. 11 and 12, the coherence corrected by the coherence correction unit 107 is used, but the coherence generated by the coherence calculation unit 112 shown in FIG. 9 may also be used.

(Another Modification)

Figure 13:
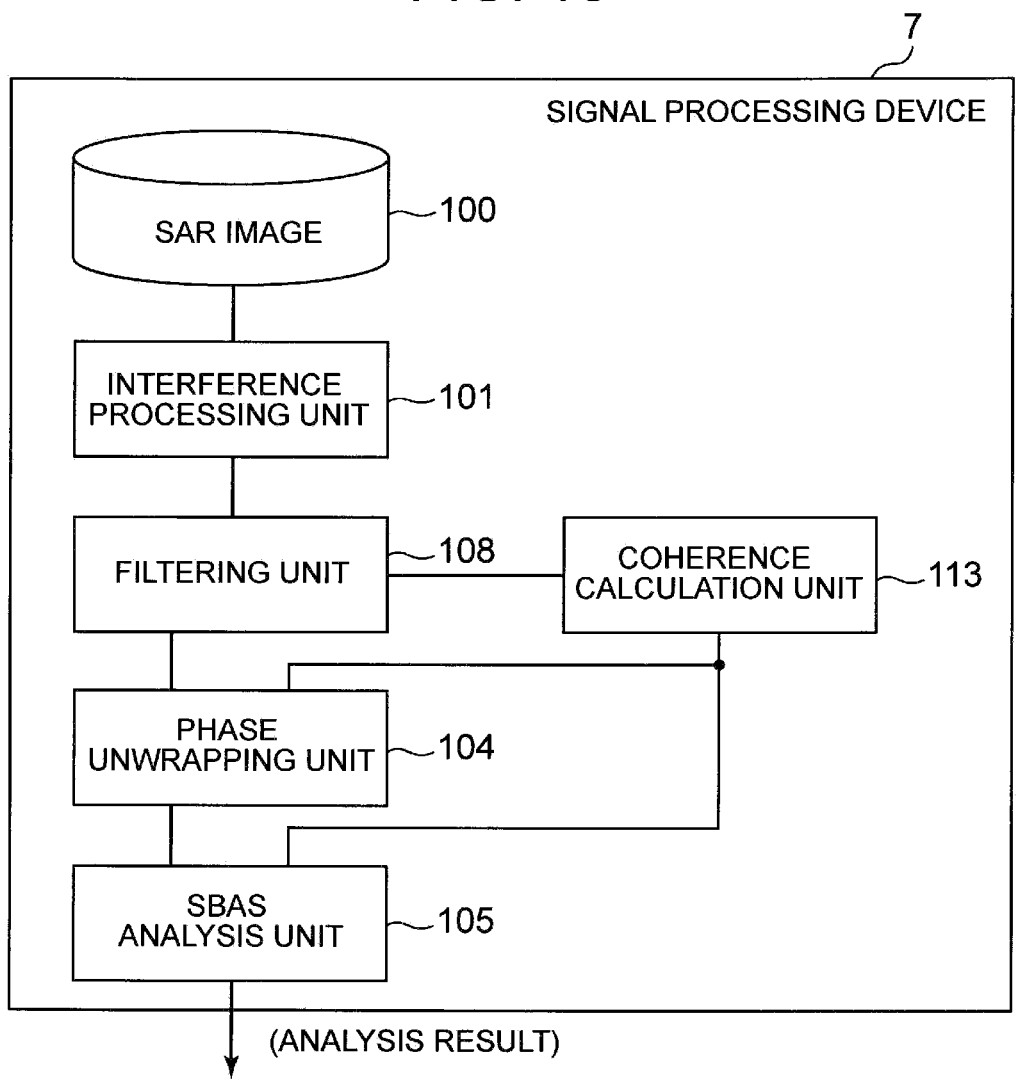
FIG. 13 It depicts a block diagram showing a configuration example of a signal processing device for a synthetic aperture radar of the third modification.

FIG. 13 a block diagram showing a configuration example of a signal processing device 7 for a synthetic aperture radar of the third modification. The signal processing unit 7 shown in FIG. 13 comprises a SAR image storage unit 100, an interference processing unit 101, a filtering unit 108, a coherence calculation unit 113, a phase unwrapping unit 104, and an SBAS analysis unit 105.

The filtering unit 108 filters the image generated by the interference processing unit 101. The filtering unit 108 is a Goldstein filter as a smoothing filter, for example. The coherence calculation unit 113 calculates coherence from the interferogram after filtering by the filtering unit 108.

Even with the signal processing device 7 configured as shown in FIG. 13, the phase unwrapping and displacement analysis processes can be performed accurately because the phase unwrapping unit 104 and the SBAS analysis unit 105 can use coherence with improved reliability.

Each component in each of the above example embodiments may be configured with a piece of hardware or a piece of software. Alternatively, the components may be configured with a plurality of pieces of hardware or a plurality of pieces of software. Further, part of the components may be configured with hardware and the other part with software.

The functions (processes) in the above example embodiments may be realized by a computer having a processor such as a central processing unit (CPU), a memory, etc. For example, a program for performing the method (processing) in the above example embodiments may be stored in a storage device (storage medium), and the functions may be realized with the CPU executing the program stored in the storage device.

Figure 14:
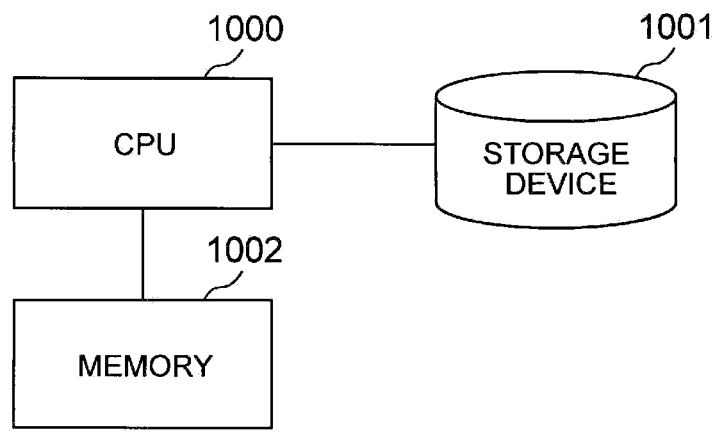
FIG. 14 It depicts a block diagram showing an example of a computer with a CPU.

FIG. 14 is a block diagram showing an example of a computer with a CPU. The computer is implemented in a signal processing device for synthetic aperture radar. The CPU 1000 executes processing in accordance with a program stored in a storage device 1001 to realize the functions in the above example embodiments. That is to say, the functions of the interference processing unit 101, the coherence calculation unit 102, 112, 113, the singular point processing unit 103A, 103B, the phase unwrapping unit 104, the SBAS analysis unit 105, the reliability calculation unit 106, the coherence correction unit 107, and the filtering unit 108 in the signal processing devices for synthetic aperture radar shown in FIGS. 1, 3, 5, 7, 9, 11 to 13 are realized.

A storage device is, for example, a non-transitory computer readable media. The non-transitory computer readable medium is one of various types of tangible storage media. Specific examples of the non-transitory computer readable media include a magnetic storage medium (for example, flexible disk, magnetic tape, hard disk), a magneto-optical storage medium (for example, magneto-optical disc), a compact disc-read only memory (CD-ROM), a compact disc-recordable (CD-R), a compact disc-rewritable (CD-R/W), and a semiconductor memory (for example, a mask ROM, a programmable ROM (PROM), an erasable PROM (EPROM), a flash ROM).

The program may be stored in various types of transitory computer readable media. The transitory computer readable medium is supplied with the program through, for example, a wired or wireless communication channel, or, through electric signals, optical signals, or electromagnetic waves.

The memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

Figure 15:
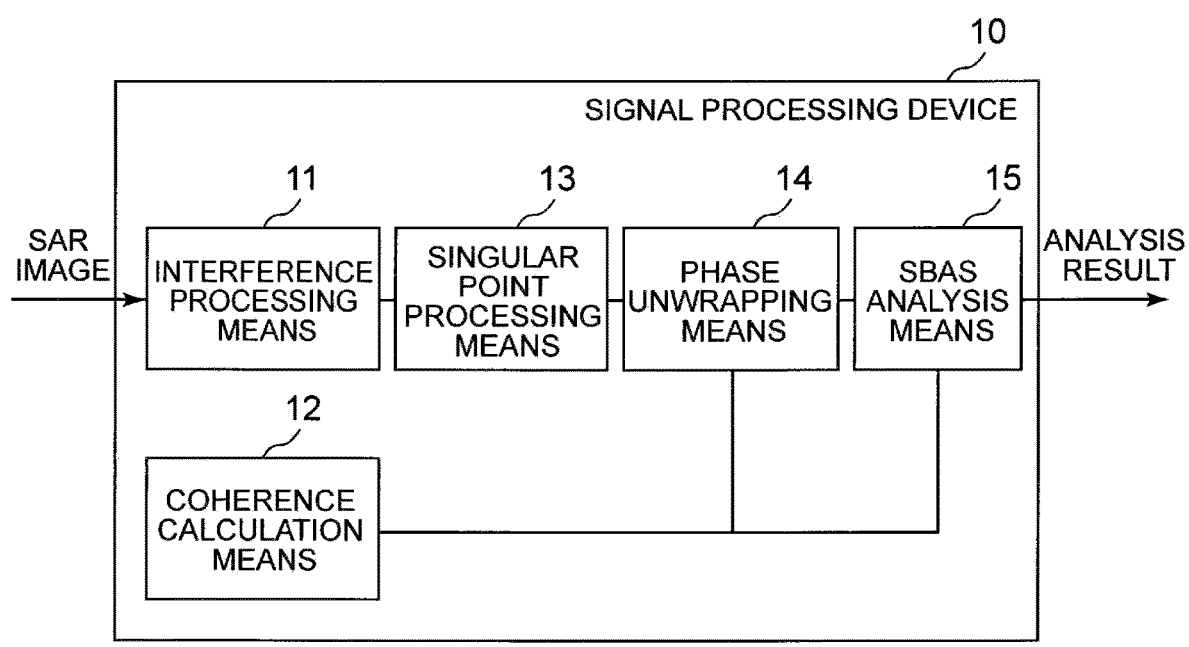
FIG. 15 It depicts a block diagram of a main part of a signal processing device for synthetic aperture radar.

FIG. 15 shows a block diagram of the main part of the signal processing device of a synthetic aperture radar. The signal processing device 10 shown in FIG. 15 comprises interference processing means 11 (in the example embodiments, realized by the interference processing unit 101) for generating an interferogram from a plurality of SAR images, coherence calculation means 12 (in the example embodiments, realized by the coherence calculation unit 102, 112) for calculating coherence of the SAR images, singular point processing means 13 (in the example embodiments, realized by the singular point processing unit 103A, 103B) for performing an operation for resolving (for example, eliminating or decreasing) singular points in the interferogram, phase unwrapping means 14 (in the example embodiments, realized by the phase unwrapping unit 104) for executing a phase unwrapping process using operation result of the singular point processing means 13, and SBAS analysis means 15 (in the example embodiments, realized by the SBAS analysis unit 105) for performing displacement analysis by SBAS, using processing result of the phase unwrapping means 14.

A part of or all of the above example embodiments may also be described as, but not limited to, the following supplementary notes.

(Supplementary note 1) A signal processing device for synthetic aperture radar comprising:
  interference processing means for generating an interferogram from a plurality of SAR images,
  coherence calculation means for calculating coherence of the SAR images,
  singular point processing means for performing an operation for resolving singular points in the interferogram,
  phase unwrapping means for executing a phase unwrapping process using operation result of the singular point processing means, and SBAS analysis means for performing displacement analysis by SBAS, using processing result of the phase unwrapping means.

(Supplementary note 2) The signal processing device for synthetic aperture radar according to Supplementary note 1, wherein
the singular point processing means calculates a weight based on a CMRF model to correct the singular point by the weight.

(Supplementary note 3) The signal processing device for synthetic aperture radar according to Supplementary note 2, wherein
the singular point processing means determines whether pixels around the singular point can be used for correction, and corrects the singular point when determining that the pixels around the singular point can be used for the correction.

(Supplementary note 4) The signal processing device for synthetic aperture radar according to Supplementary note 2 or 3, further comprising coherence correction means for determining reliability according to degree of correction and correcting the coherence based on determination result, when the singular point processing means corrects the singular point.

(Supplementary note 5) The signal processing device for synthetic aperture radar according to Supplementary note 2 or 3, further comprising coherence correction means for correcting the coherence based on the calculated weight, when the singular point processing means corrects the singular point.

(Supplementary note 6) The signal processing device for synthetic aperture radar according to any one of Supplementary notes 1 to 5, wherein
the coherence calculation means calculates the coherence using the interferogram in which the singular points have been resolved.

(Supplementary note 7) The signal processing device for synthetic aperture radar according to Supplementary note 4 or 5, wherein
at least one of the phase unwrapping means and the SBAS analysis means uses the corrected coherence.

(Supplementary note 8) The signal processing device for synthetic aperture radar according to Supplementary note 6, wherein
at least one of the phase unwrapping means and the SBAS analysis means uses the coherence calculated using the interferogram in which the singular points have been resolved.

(Supplementary note 9) A signal processing method for synthetic aperture radar comprising:
generating an interferogram from a plurality of SAR images,
calculating coherence of the SAR images,
performing an operation for resolving singular points in the interferogram,
executing a phase unwrapping process using operation result of the singular point processing means, and
performing displacement analysis by SBAS, using result of the phase unwrapping process.

(Supplementary note 10) The signal processing method for synthetic aperture radar according to Supplementary note 9, wherein
a weight is calculated based on a CMRF model to correct the singular point by the weight.

(Supplementary note 11) The signal processing method for synthetic aperture radar according to Supplementary note 10, wherein
pixels around the singular point are determined whether they can be used for correction, and the singular point is corrected when determining that the pixels around the singular point can be used for the correction.

(Supplementary note 12) The signal processing method for synthetic aperture radar according to Supplementary note 10 or 11, wherein
reliability according to the degree of correction of the phase singularity is determined and the coherence is corrected according to the result of the determination, when the phase singularity is corrected.

(Supplementary note 13) The signal processing method for synthetic aperture radar according to Supplementary note 10 or 11, further comprising correcting the coherence based on the calculated weight, when the singular point is corrected.

(Supplementary note 14) A signal processing program for synthetic aperture radar causing a computer to execute:
a process of generating an interferogram from a plurality of SAR images,
a process of calculating coherence of the SAR images,
a process of performing an operation for resolving singular points in the interferogram,
a process of executing a phase unwrapping process using operation result of the singular point processing means, and
a process of performing displacement analysis by SBAS, using result of the phase unwrapping process.

(Supplementary note 15) The signal processing program for synthetic aperture radar according to Supplementary note 14, further causing a computer to execute:
a process of calculating a weight based on a CMRF model to correct the singular point by the weight.

(Supplementary note 16) The signal processing program for synthetic aperture radar according to Supplementary note 15, further causing a computer to execute:
a process of determining whether pixels around the singular point can be used for correction, and correcting the singular point when determining that the pixels around the singular point can be used for the correction.

(Supplementary note 17) The signal processing program for synthetic aperture radar according to Supplementary note 15 or 16, further causing a computer to execute:
a process of determining reliability according to degree of correction and correcting the coherence based on determination result, when the phase singularity is corrected.

(Supplementary note 18) The signal processing program for synthetic aperture radar according to Supplementary note 15 or 17 further causing a computer to execute:
a process of correcting the coherence based on the calculated weight, when the phase singularity is corrected.

Although the invention of the present application has been described above with reference to example embodiments, the present invention is not limited to the above example embodiments. Various changes can be made to the configuration and details of the present invention that can be understood by those skilled in the art within the scope of the present invention.

REFERENCE SIGNS LIST 1, 2, 3, 4, 5, 6A, 6B, 7, 10 Signal processing device
11 Interference processing means
12 Coherence calculation means
13 Singular point processing means
14 Phase unwrapping means
15 SBAS analysis means 100 SAR image storage unit
101 Interference processing unit
102, 112, 113 Coherence calculation unit
103A, 103B Singular point processing unit
104 Phase unwrapping unit
105 SBAS analysis unit
106 Reliability calculation unit
107 Coherence correction unit
108 Filtering unit
1000 CPU
1001 Storage device
1002 Memory

The invention claimed is:

1. A signal processing device for synthetic aperture radar comprising:
a memory storing software instructions; and
one or more processors configured to execute the software instructions to:
generate an interferogram from a plurality of SAR images;
calculate coherence of the SAR images;
perform an operation for resolving singular points in the interferogram;
execute a phase unwrapping process using an operation result of the operation for resolving singular points; and
perform displacement analysis by SBAS (Small BAseline Subset) using a processing result of the phase unwrapping process,
wherein the one or more processors are configured to determine whether pixels around the singular point can be used for correction, and calculate a weight based on a CMRF (Complex-Valued Markov Random Field) model to correct the singular point by the weight when determining that the pixels around the singular point can be used for the correction.

2. The signal processing device for synthetic aperture radar according to claim 1, wherein the one or more processors are configured to execute the software instructions to determine reliability according to degree of correction and correct the coherence based on a determination result, when correcting the singular point.

3. The signal processing device for synthetic aperture radar according to claim 1, wherein the hardware implements a coherence correction unit the one or more processors are configured to execute the software instructions to correct the coherence based on the calculated weight, when correcting the singular point.

4. The signal processing device for synthetic aperture radar according to claim 1, wherein the one or more processors are configured to execute the software instructions to calculate the coherence using the interferogram in which the singular points have been resolved.

5. The signal processing device for synthetic aperture radar according to claim 2, wherein the one or more processors are configured to execute the software instructions to use the corrected coherence.

6. The signal processing device for synthetic aperture radar according to claim 4, wherein the one or more processors are configured to execute the software instructions to use the coherence calculated using the interferogram in which the singular points have been resolved.

7. A signal processing method for synthetic aperture radar implemented by a processor, the method comprising:
generating an interferogram from a plurality of SAR images;
calculating coherence of the SAR images;
performing an operation for resolving singular points in the interferogram,
executing a phase unwrapping process using a result of the operation, and
performing displacement analysis by SBAS (Small BAseline Subset), using a result of the phase unwrapping process;
wherein pixels around the singular point are determined whether they can be used for correction, and a weight is calculated based on a CMRF (Complex-Valued Markov Random Field) model to correct the singular point by the weight when determining that the pixels around the singular point can be used for the correction.

8. The signal processing method for synthetic aperture radar according to claim 7, wherein reliability according to the degree of correction of the phase singularity is determined and the coherence is corrected according to a result of the determination, when the phase singularity is corrected.

9. The signal processing method for synthetic aperture radar according to claim 7, further comprising correcting the coherence based on the calculated weight, when the singular point is corrected.

10. A non-transitory computer readable information recording medium storing a signal processing program for synthetic aperture radar, the signal processing program, if executed, causes a computer to execute:
generating an interferogram from a plurality of SAR images;
calculating coherence of the SAR images;
performing an operation for resolving singular points in the interferogram,
executing a phase unwrapping process using a result of the operation; and
performing displacement analysis by SBAS (Small BAseline Subset); using a result of the phase unwrapping process;
determining whether pixels around the singular point can be used for correction; and
calculating a weight based on a CMRF (Complex-Valued Markov Random Field) model to correct the singular point by the weight when determining that the pixels around the singular point can be used for the correction.

11. The information recording medium according to claim 10, wherein the signal processing program for synthetic aperture radar further causing a computer to execute:
determining reliability according to degree of correction and correcting the coherence based on a determination result, when the phase singularity is corrected.

12. The information recording medium according to claim 10, wherein the signal processing program for synthetic aperture radar further causing a computer to execute:
correcting the coherence based on the calculated weight, when the phase singularity is corrected.

* * * * *